Oct. 14, 1952  P. H. PALEN  2,613,908
THREE-WAY BALL VALVE
Filed May 14, 1947
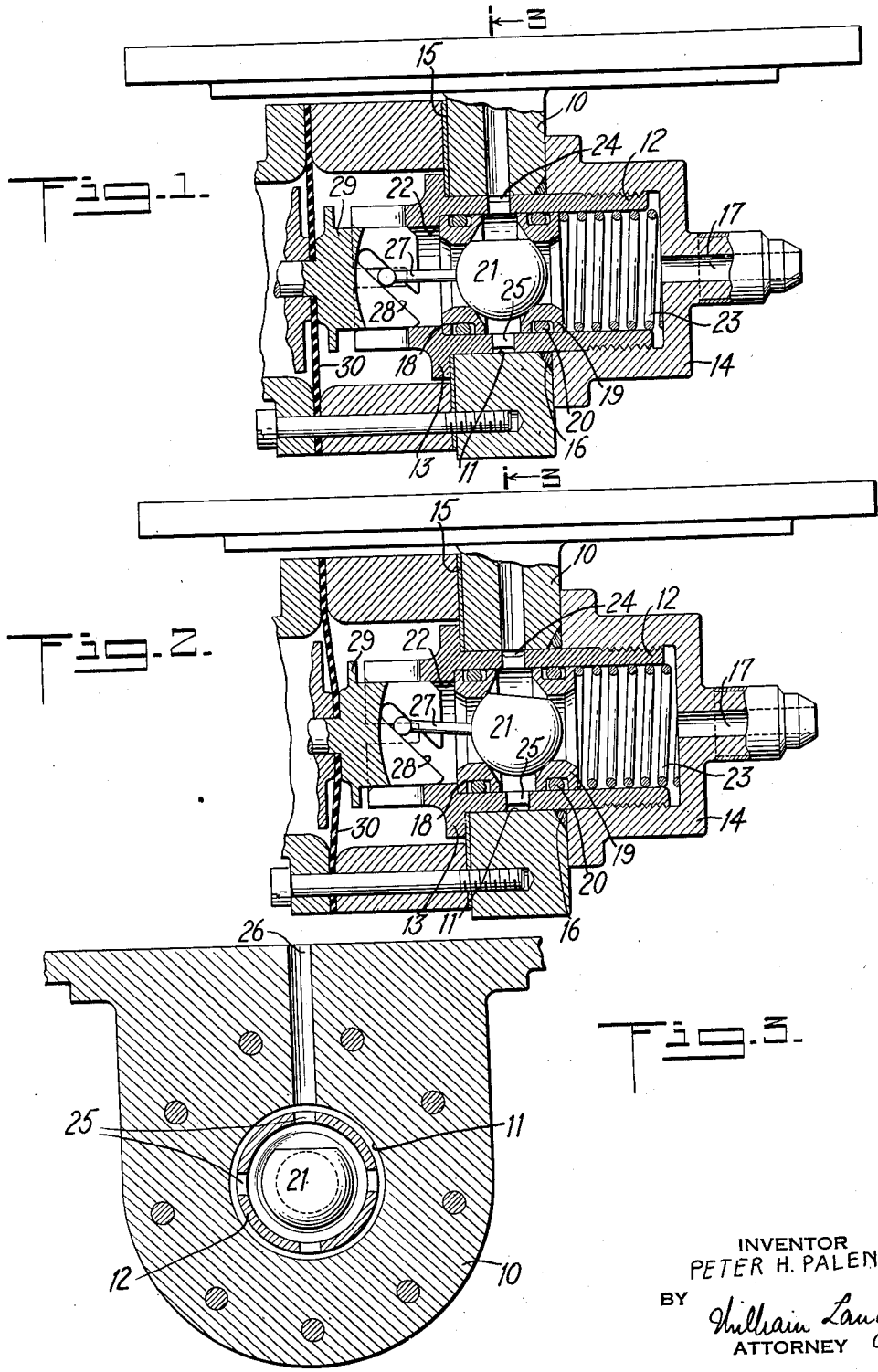
INVENTOR
PETER H. PALEN
BY
William Lang
ATTORNEY Patented Oct. 14, 1952

2,613,908

UNITED STATES PATENT OFFICE 2,613,908

THREE-WAY BALL VALVE

Peter H. Palen, Paterson, N. J., assignor to Reaction Motors, Inc., Dover, N. J., a corporation of New Jersey Application May 14, 1947, Serial No. 747,929

1 Claim. (Cl. 251—109)

The present invention relates to fluid control valves and more particularly to an improved valve of the three-way type.

It is an object of the invention to provide an improved valve of simplified construction, wherein close manufacturing tolerances are not required and initial assembly thereof may be quickly effected.

A further object of the invention is to provide a valve construction embodying a valve seating arrangement which is self-compensating upon initial assembly and also after wear of the parts occurs.

A still further object is to provide a valve construction in which the port opening and closing member is free, floating between its seats, which latter are resiliently urged against the member to effect a seal and maintain it after wear occurs.

Other objects of the invention will be pointed out in the following description and claim and illustrated in the accompanying drawings, which disclose, by way of example, the principle of the invention and best mode, which has been contemplated, of applying that principle.

In the drawings:

Fig. 1 is a sectional elevation of the valve and its operating means, with the valve in closed position.

Fig. 2 is a similar section in part, with the valve shown in open or operating position.

Fig. 3 is a section taken on lines 3—3 of Fig. 1.

Referring to the drawings, 10 represents the main supporting member which is provided with an annular opening 11, through which the valve body 12 extends. Valve body 12 is securely clamped to member 10 between its flange 13 and head 14 threaded on the body. Gasket 15 and sealing ring 16 serve to provide a tight seal. Head 14 is configured for connection to a line from which fluid may be admitted to the interior of the valve body through port 17.

Within the valve body is slidably fitted a pair of identical circular valve seats 18 and 19, each with an annular groove for retaining a pressure seal ring 20. Between the seats 18 and 19 is positioned a ball 21 flatted at the top so that, when in the position shown in Fig. 1, it seals the opening through both seats 18 and 19. Body 12 is shouldered at 22 and a spring 23 exerts pressure against seat 19, so that the seats and ball are urged toward the shoulder in accordance with the compression of the spring. Body 12 has an annular groove 24 in substantial alignment with the center of ball 21 and a plurality of holes 25 serve to afford communication from the space between seats 18 and 19 and the groove 24. In line with the groove 24 is a duct 26 through member 10 to which a line may be connected in any suitable manner.

The valve is assembled by simply extending body 12 through opening 11, sliding seat 18, ball 21, seat 19 and spring 23 into the body in succession and threading the head 14 in place. This having been done, the valve is in readiness to function with spring 23 compressing the elements as in Fig. 1, where the ball is in closing position. If port 17 is now connected to a source of pressure, seat 19 will be subjected to a further force acting against its right hand surface, pressing it tightly against ball 21 and the latter pressing tightly against seat 18, preventing any passage of fluid or gas while the ball is in its closing position.

By tilting the ball to the position of Fig. 2 so as to expose the flatted area to the opening through seat 19, a flow of fluid or gas will occur through the seat 19 into the chamber between the seats, thence through the holes 25 and groove 24 to duct 26, from where it is directed to its destination.

Returning the ball to its Fig. 1 position, the flow will be interrupted and, if desired, by tilting ball 21 in the opposite direction so as to expose the flatted area to the opening through seat 18 the duct 26 and the chamber between the seats will be vented through seat 18.

One form of mechanism for tilting the ball may comprise a stem 27 integral with the ball and extending in the direction of the axis of the valve body. A cross bar at its free end is slidable in a cam groove 28 in a plunger 29 slidable in the valve bore. Thus, by sliding plunger 29 to the right as in Fig. 2 the end of stem 27 will be tilted up to rock the ball clockwise to its opening position, and by sliding the plunger in the opposite direction the ball will be rocked counterclockwise to its venting position.

The plunger 29 is supported in a diaphragm 30 which serves to hold it normally in its central position, and application of pressure through means not shown to deflect the diaphragm to the left or right will cause a corresponding movement of the plunger to operate ball 21.

It is to be noted that the only force to be overcome in actuating the valve is that required to balance the friction load of the ball 21 on the contacting edges of the seats 18 and 19. This force being small in terms of the usual actuating loads found in pneumatic valves, the mechanism can be said to have a minimum of lag, and the effect of varying the source pressure through port 17 can be considered negligible within the range of operation, thus allowing the characteristic of the valve to be treated as a constant. This characteristic depends on the amount of overlap between the flatted side of the ball and the throats of the opposed seats, which in turn is a measure of the lost motion travel in the operating device.

With the construction described, it will be apparent that as wear occurs in the ball or seats or both the sealing pressure will nevertheless remain effective with the ball shifting slightly to the left to compensate for changes in dimension.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claim.

What is claimed is:

A valve body having a fluid passage therethrough, a pair of spaced circular valve seats in said passage one of which is spring loaded, a solid ball positioned within the space between the seats and solely supported thereby for rotary movement, said ball having a flat thereon so configured that when the ball is in one position it affords communication past the said flat between one end of the passage and the space between said seats, in a second position it affords communication between the other end of the passage and the space between the seats, and in a third position it prevents such communication, and means for rotatively tilting said ball from one to each of the other positions about a transverse central axis of said ball which is perpendicular to the longitudinal axis of said passage and substantially parallel to the said flat.

PETER H. PALEN.

REFERENCES CITED

The following references are of record in the file of this patent:

UNITED STATES PATENTS

| Number | Name | Date |
|---|---|---|
| 238,768 | Drucklieb | Mar. 15, 1881 |
| 548,518 | Casey | Oct. 22, 1895 |
| 779,786 | Kilbourn | June 10, 1905 |
| 1,195,336 | Canning | Aug. 22, 1916 |
| 1,670,691 | Riggin | May 22, 1928 |
| 1,677,242 | Larrigan | July 17, 1928 |
| 1,681,966 | Zeidler | Aug. 28, 1928 |
| 2,078,315 | Coltman | Apr. 27, 1937 |
| 2,201,895 | Glen | May 2, 1940 |
| 2,337,321 | Freeman | Dec. 21, 1943 |

FOREIGN PATENTS

| Number | Country | Date |
|---|---|---|
| 18,023 | Great Britain | July 31, 1897 |